United States Patent
Esbensen et al.

(10) Patent No.: US 9,347,431 B2
(45) Date of Patent: May 24, 2016

(54) DAMPING WIND TURBINE TOWER OSCILLATIONS USING GYROSCOPIC FORCES

(71) Applicants: Thomas Esbensen, Herning (DK); Gustav Hoegh, Herning (DK); Kristian Holm-Joergensen, Vejle (DK)

(72) Inventors: Thomas Esbensen, Herning (DK); Gustav Hoegh, Herning (DK); Kristian Holm-Joergensen, Vejle (DK)

(73) Assignee: Siemens Aktiengesellschaft, Munich (DE)

( * ) Notice: Subject to any disclaimer, the term of this patent is extended or adjusted under 35 U.S.C. 154(b) by 153 days.

(21) Appl. No.: 14/214,792

(22) Filed: Mar. 15, 2014

(65) Prior Publication Data

US 2014/0339827 A1 Nov. 20, 2014

(30) Foreign Application Priority Data

May 17, 2013 (EP) .................................... 13168207

(51) Int. Cl.
*F02D 9/00* (2006.01)
*F03D 7/02* (2006.01)
*F03D 9/00* (2016.01)

(52) U.S. Cl.
CPC ............ *F03D 7/0296* (2013.01); *F03D 7/0204* (2013.01); *F03D 9/002* (2013.01); *F03D 7/0292* (2013.01); *F05B 2260/96* (2013.01); *F05B 2270/1095* (2013.01); *F05B 2270/332* (2013.01); *Y02E 10/723* (2013.01)

(58) Field of Classification Search
USPC .................................................... 290/44, 55
See application file for complete search history.

(56) References Cited

U.S. PATENT DOCUMENTS

| | | | | |
|---|---|---|---|---|
| 4,420,692 A * | 12/1983 | Kos | ........................ | F03D 7/0224 290/44 |
| 4,435,647 A * | 3/1984 | Harner | .................. | F03D 7/0224 290/44 |
| 2007/0176428 A1* | 8/2007 | Nagao | ................... | F03D 7/0296 290/44 |
| 2009/0263245 A1* | 10/2009 | Shi | ............................ | F03D 7/02 416/43 |
| 2011/0311359 A1* | 12/2011 | Bjork | ................... | F03D 7/0204 416/1 |
| 2012/0043758 A1* | 2/2012 | Esbensen | .............. | F03D 7/0296 290/44 |
| 2013/0209254 A1* | 8/2013 | Hess | ....................... | F03D 7/042 416/1 |
| 2014/0003936 A1* | 1/2014 | Agarwal | ................... | F03D 7/02 416/1 |
| 2014/0017083 A1* | 1/2014 | Pineda Amo | ............ | F03D 7/06 416/37 |
| 2015/0076822 A1* | 3/2015 | Creaby | ................. | F03D 7/0276 290/44 |

FOREIGN PATENT DOCUMENTS

| | | |
|---|---|---|
| DE | 29715249 U1 | 12/1998 |
| EP | 2146093 B1 | 10/2011 |
| EP | 2489872 A1 | 8/2012 |

* cited by examiner

*Primary Examiner* — Tho D Ta
(74) *Attorney, Agent, or Firm* — Beusse Wolter Sanks & Maire

(57) ABSTRACT

A method and a control device for damping an oscillatory movement of the top of a tower of a wind turbine are provided. The described method includes (a) rotating a rotor being rotatably attached to a nacelle of the wind turbine with a rotational speed, and (b) yawing the nacelle of the wind turbine around an axis being aligned with the longitudinal axis of the tower with a yawing speed. Thereby, a yawing movement being associated with yawing the nacelle is coordinated with the oscillatory movement in such a manner that a gyroscopic torque resulting (i) from rotating the rotor and (ii) from yawing the rotor damps the oscillatory movement of the top of the tower. A wind turbine comprising such a control device and a computer program for controlling this method are also provided.

10 Claims, 4 Drawing Sheets

DAMPING WIND TURBINE TOWER OSCILLATIONS USING GYROSCOPIC FORCES

CROSS REFERENCE TO RELATED APPLICATIONS

This application claims the benefit of European Application No. EP 13168207 filed May 17, 2013, incorporated by reference herein in its entirety.

FIELD OF INVENTION

The present invention generally relates to the technical field of operating wind turbines. Specifically, the present invention relates to the technical field of operating a wind turbine in such a manner that fatigue loads acting on a tower of the wind turbine are minimized. In particular, the present invention relates to a method and to a control device for damping an oscillatory movement of the top of a tower of a wind turbine. Further, the present invention relates to a wind turbine comprising such a control device and to a computer program for controlling this method.

ART BACKGROUND

The fatigue load a tower of a wind turbine has to withstand is often a key parameter for the structural design of a wind turbine tower. If it is possible to reduce the fatigue load acting on the wind turbine tower then the tower could be manufactured with a less amount of steel which would result in a reduced cost and in a reduced weight of the tower. Alternatively, with a reduced fatigue load acting on the same wind turbine tower the tower could have a longer life time.

During the operation of a wind turbine there are two basically different directions of tower movements which result in fatigue loads acting on the tower of the wind turbine. A first fatigue load results from a tower top movement in a direction being horizontal and perpendicular to the direction of the wind. These tower top oscillations may be called side-side oscillations. A second fatigue load results from a tower top movement in a direction along the direction of the wind. These tower top oscillations may be called fore-aft oscillations.

EP 2146093 B1 discloses a method for damping oscillations of a tower of a wind turbine where the side-side tower fatigue load is reduced by damping the tower movement using a sinusoidal signal added to a power/torque reference signal used for controlling the operation of a wind turbine. The added signal will generate a sinusoidal component in the torque applied by the turbine generator which is located in the nacelle of the wind turbine. FIG. 5 shows that e.g. a clockwise torque moves the wind turbine tower top to the right. By measuring the tower top movement, e.g. by using accelerometers, it is now straight-forward to calculate a signal which is effective for damping any existing side-side movement of the tower.

For actively damping in particular fore-aft oscillations of a tower of a wind turbine it is known to add a sinusoidal signal to a pitch angle reference signal used for operating the wind turbine. This causes a variation of the pitch angle of the rotor blades which leads to a change in the thrust force from the rotor affecting the tower top, such that it will have a sinusoidal force component. If the sinusoidal force has the correct phase it can be used to damp tower top fore-aft movements. This known procedure has the disadvantage that it results in an increased pitch activity (more movement of the pitch system) with typically a very high loading on the pitch system incl. blade pitch bearings of the pitch system of the respective wind turbine.

There may be a need for reducing in an easy and effective manner a fore-aft oscillatory movement of a tower of a wind turbine.

SUMMARY OF THE INVENTION

This need may be met by the subject matter according to the independent claims. Advantageous embodiments of the present invention are described by the dependent claims.

According to a first aspect of the invention there is provided a method for damping an oscillatory movement of the top of a tower of a wind turbine. The provided method comprises (a) rotating a rotor being rotatably attached to a nacelle of the wind turbine with a rotational speed, and (b) yawing the nacelle of the wind turbine around an axis being aligned with the longitudinal axis of the tower with a yawing speed. A yawing movement being associated with yawing the nacelle is coordinated with the oscillatory movement in such a manner that a gyroscopic torque resulting (i) from rotating the rotor and (ii) from yawing the rotor damps the oscillatory movement of the top of the tower.

The described method is based on the idea that gyroscopic forces and in particular a gyroscopic torque, which results both from rotating and from yawing the rotor having a given moment of inertia, can be used for damping or reducing oscillatory movements of the top of a tower of a wind turbine. With the described damping method oscillations of (the top of) the tower in the fore-aft direction with respect to the direction of the wind driving the wind turbine can be avoided or, in case such fore-aft oscillations have already been developed, can be damped in an easy and effective manner.

In this respect the term "rotor" may refer to the mechanical system comprising a rotor hub and at least two rotor blades extending radially from the rotor hub. According basic principles of the physics of rigid body rotations the moment of inertia J is generally given by the following formula (I):

$$J = \int_V \rho(r) r^2 dV \qquad (I)$$

Thereby, r is the radius vector to a point in the rigid body from the specified rotational axis, and $\rho(r)$ is the mass density at each point r. The integration is evaluated over the whole volume V of the rigid body. Since the rotor blades have a spatial extension which reaches far away from the rotational axis the rotor blades represent the largest contribution to the moment of inertia J of the rotor. Compared to the contribution of the rotor blades the rotor hub and a rotor shaft, which connect the rotor hub directly or indirectly (e.g. via a gear box) to an electric generator of the wind turbine, represent a much smaller and typically negligible contribution to the moment of inertia J of the rotor.

The gyroscopic torque Mg resulting from the combined rotating and yawing of the rotor is, in accordance with the well known gyroscopic theory, given by the following formula (II):

$$\vec{Mg} = J \cdot \vec{\Omega} \times \vec{\omega}_y \qquad (II)$$

Thereby, $\vec{\Omega}$ is the vector representing the rotational movement of the rotor. The vector $\vec{\Omega}$ is aligned with the rotational axis of the rotor. $\vec{\omega}_y$ is the vector representing the yawing movement of the rotor respectively of the nacelle. The vector $\vec{\omega}_y$ is aligned with the longitudinal and vertical extension of the tower. As a consequence of the vector product of formula (II) the vector $\vec{Mg}$ is oriented perpendicular both $\vec{\Omega}$ and to $\vec{\omega}_y$.

In this respect it is mentioned that in reality the rotor respectively the nacelle may be tilted a little bit such that $\vec{\Omega}$ and $\vec{\omega}_y$ are not exactly perpendicular to each other. However, the tilt angle (typically 5 to 6 deg) is relative small such that the assumption taken below is reasonable.

In a wind turbine $\vec{\Omega}$ and $\vec{\omega}_y$ are perpendicular to each other and $\vec{Mg}$ is oriented in horizontal direction and perpendicular to the rotor shaft respectively the wind direction. Therefore, depending on the direction of $\vec{Mg}$ the gyroscopic torque $|\vec{Mg}|$ has the effect that the top of the tower tends to move fore or aft with respect to the rotational axis of the rotor respectively the wind direction. As a consequence, formula (II) can be rewritten in the following form:

$$|\vec{Mg}| = J \cdot |\vec{\Omega}| \cdot \vec{\omega}_y \qquad (III)$$

Given typical values of $3.4 \cdot 10^7$ kgm$^2$ for J, 1.4 rad/s for $|\vec{\Omega}|$, and 0.08 rad/s for $\vec{\omega}_y$, one ends up with a gyroscopic torque $|\vec{Mg}|$ of 3800 kNm, which acts on the nacelle respectively the top of the tower. This gyroscopic torque has a dimension which is large enough in order to damp an oscillatory movement of the top of the wind turbine tower.

In this respect it is mentioned that the sign of the gyroscopic torque $|\vec{Mg}|$ is a function of the rotor speed direction of the rotational speed of the rotor (which is typically always the same) and the direction of the yawing speed (or yaw direction), which can be controlled. Therefore, by controlling the yaw direction one can control the direction of the gyroscopic torque $|\vec{Mg}|$. Further, by controlling the quantum of the yawing speed one can control the strength of the gyroscopic torque $|\vec{Mg}|$ acting on the nacelle respectively the top of the rotor.

According to a further embodiment of the invention the method further comprises (a) measuring a movement of the tower and (b) determining the oscillatory movement of the top of the tower based on the measured tower movement.

For measuring the tower top movement there may be used different types of measurement. Specifically, the tower top oscillatory movement can be estimated or measured based on the oscillatory varying position of the tower top, the oscillatory speed and/or the oscillatory acceleration of the tower top. In practice, it may be easiest to measure the acceleration of the tower top and to derive from the resulting acceleration values the oscillatory tower top movement. However, measuring the tower top speed, the tower top position or the tilt angle of the tower top may also, instead or in combination, be used for determining the movement of the tower top.

In this respect it is mentioned that the movement of the tower top strongly correlates with the movement of the nacelle being mounted on the top of the tower. Therefore, it is also possible to use measurement instruments which are installed within or at the nacelle for determining the movement of the tower top.

It is mentioned that instead of measuring the tower top oscillatory movement also a mechanical strain and/or a mechanical load in the tower can be measured by using strain gauges. The signal output of such strain gauges can be used for determining the tower top oscillatory movement. Alternatively or in combination the signal output of such strain gauges can be used for timing the yawing movement respectively the gyroscopic torque, which result in the described damping of the tower top movement.

According to a further embodiment of the invention the oscillatory movement of the top of the tower of the wind turbine has a periodic time dependency and the sign of the oscillatory movement of changes periodically. Further, the yawing movement has a periodic time dependency and the direction of yawing the rotor changes periodically such that the resulting gyroscopic torque has a periodic time dependency and the sign of the gyroscopic torque changes periodically.

Descriptive speaking, by periodically changing the yawing movement of the rotor respectively the nacelle the resulting gyroscopic torque also changes periodically. As a consequence, the described method can be used for damping an oscillatory movement of the tower top, which has a periodic time dependency. This may provide the advantage that the described method can be used effectively for reducing a periodic mechanical torque acting on the tower top, which periodic mechanical torque frequently occurs when the tower top exhibits fore-aft oscillations.

According to a further embodiment of the invention the periodic time dependency of the oscillatory movement of the top of the tower is at least approximately sinusoidal and the periodic time dependency of the yawing movement and the resulting gyroscopic torque is at least approximately sinusoidal.

By changing the yawing movement of the rotor respectively of the nacelle in a sinusoidal manner a sinusoidal oscillatory movement of the top of the tower of the wind turbine in a fore-aft direction can be reduced or damped in an effective manner.

According to a further embodiment of the invention (a) the periodic time dependency of the yawing movement and (b) the periodic time dependency of the oscillatory movement are in phase opposition with respect to each other.

Descriptively speaking, by synchronizing the yawing movement respectively the gyroscopic torque with an existing periodic fore-aft movement of the tower the tower top oscillations can be damped in an effective manner.

In this respect it is clear that once these fore-aft oscillations have been successfully damped to such an extend that there is no significant fore-aft movement of the tower top any more, the described yawing of the nacelle should also been stopped in order not to generate again fore-aft oscillations resulting from the gyroscopic torque acting on the tower top.

According to a further embodiment of the invention yawing the nacelle of the wind turbine is carried out for aligning the rotational axis of the rotor at least approximately with an actual direction of a wind driving the wind turbine. Thereby, the yawing activity is timely coordinated with a periodic fore-aft movement of the top of the tower. This may mean that when yawing the rotational axis of the rotor of the wind turbine into the wind direction this yawing movement can be timely coordinated with present fore-aft oscillations of the tower in such a manner that the onset of the gyroscopic torque and/or the stop of the gyroscopic torque result in an angular momentum which contributes to a damping of the fore-aft tower oscillations.

The described yawing movement which is coordinated with the fore-aft tower oscillations may at least in some operational conditions allow for reducing at least partially the oscillatory movement of the top of the tower without, in addition to a required yawing movement for aligning the rotational axis of the tower with the actual wind direction, adding an extra yawing movement for the sole purpose of generating a gyroscopic torque. The time dependency of the gyroscopic force resulting from a usual yawing can be exploited, when the yawing activity is applied in a coordinated or scheduled manner, in a beneficial manner for reducing and/or for damping present tower top fore-aft oscillations.

According to a further aspect of the invention there is provided a control device for damping an oscillatory movement of the top of a tower of a wind turbine. The provided control device comprises a processing unit configured for coordinating (i) a yawing movement being associated with yawing a nacelle of the wind turbine with a yawing speed around an axis being aligned with the longitudinal axis of the tower with (ii) the oscillatory movement of the top of the tower in such a manner that a gyroscopic torque resulting (a) from rotating the rotor with a rotational speed and (b) from yawing the rotor damps the oscillatory movement of the top of the tower.

Also the described control device is based on the idea that a gyroscopic torque resulting both from rotating and from yawing the rotor having a given moment of inertia can be used for reducing and/or for damping an oscillatory movement of the top of a tower of a wind turbine. Thereby, oscillations of (the top of) the tower in the fore-aft direction with respect to the wind driving the wind turbine can be avoided or, in case such fore-aft oscillations have already been developed, can be damped easily and effectively.

In order to realize the described invention it may not be necessary to redesign an existing wind turbine in a structural manner and/or to provide an existing wind turbine with additional sensors and/or with additional actors being used. Specifically, acceleration sensors can be used for measuring the fore-aft accelerations of the top of the tower. Thereby, the output signal of an acceleration sensor may be indicative for the mechanical torque acting on the top of the tower. Of course, also other types of sensors such as a positioning sensor, e.g. a sensitive GPS receiver, may be used for determining the movement of the tower top respectively the mechanical torque acting on the tower top.

For generating the yawing movement of the rotor respectively the yawing movement of the nacelle an existing yaw system can be used, which is necessary for every wind turbine in order to position the rotor plane perpendicular to the direction of the wind driving the wind turbine.

According to a further aspect of the invention there is provided a wind turbine for generating electrical power. The provided wind turbine comprises (a) a rotor having at least one blade, wherein the rotor is rotatable around a rotational axis and the at least one blade extends radial with respect to the rotational axis (110a), (b) a generator being mechanically coupled with the rotor, and (c) a control device as described above.

According to a further aspect of the invention there is provided a computer program for damping an oscillatory movement of the top of a tower of a wind turbine. The computer program, when being executed by a data processor, is adapted for controlling and/or for carrying out the above described method for damping an oscillatory movement of the top of a tower of a wind turbine.

As used herein, reference to a computer program is intended to be equivalent to a reference to a program element and/or to a non-transitory computer readable medium containing instructions for controlling a computer system to coordinate the performance of the above described method.

The computer program may be implemented as computer readable instruction code in any suitable programming language, such as, for example, JAVA, C++, and may be stored on a non-transitory computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
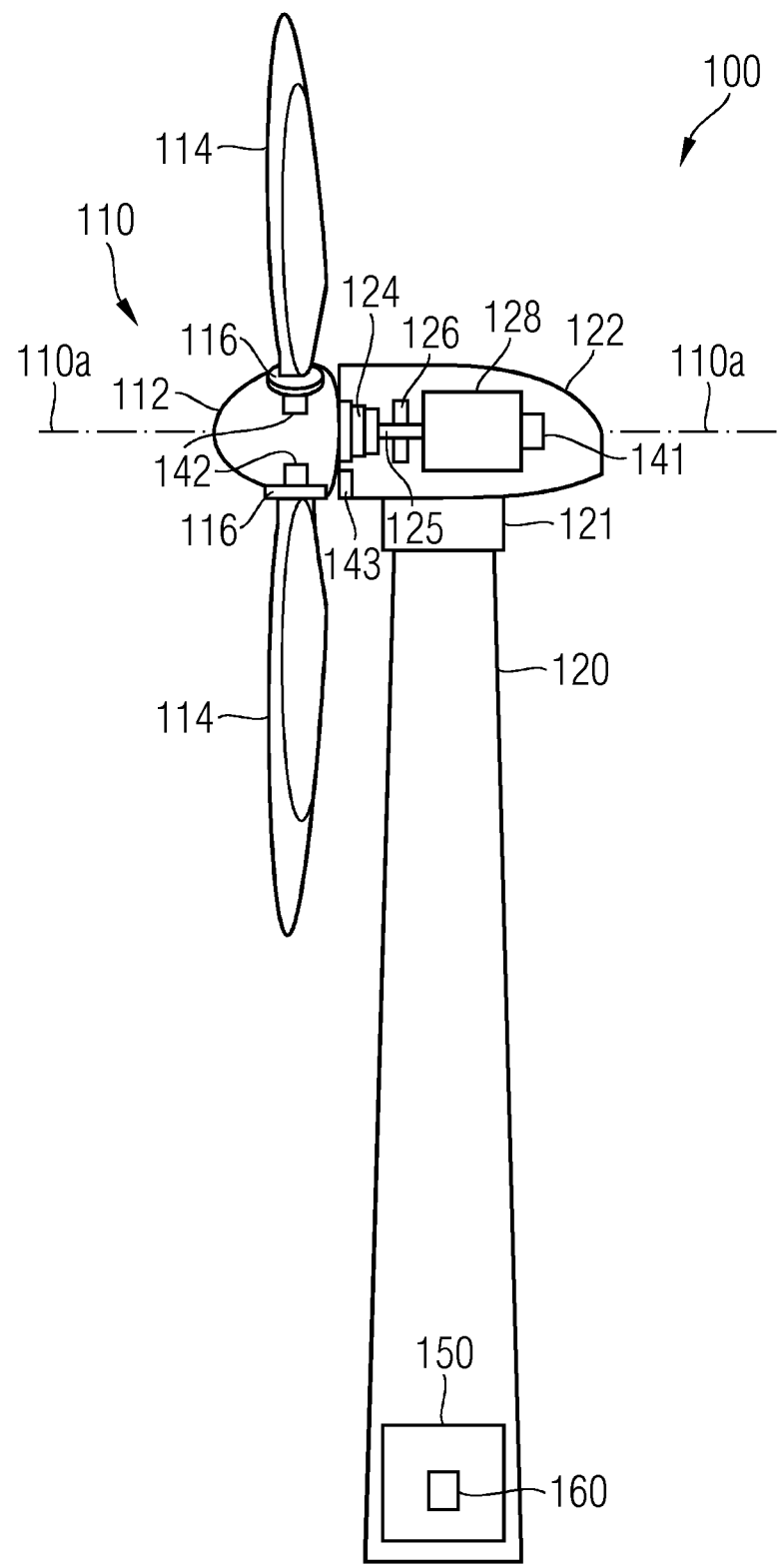
FIG. 1 shows a wind turbine according to an embodiment of the present invention.

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

FIG. 1 shows a wind turbine 100 according to an embodiment of the invention. The wind turbine 100 comprises a tower 120, which is mounted on a non-depicted fundament. On top of the tower 120 there is arranged a nacelle 122. In between the tower 120 and the nacelle 122 there is provided a yaw angle adjustment system 121, which is capable of rotating the nacelle 122 around a non depicted vertical axis, which is aligned with the longitudinal extension of the tower 120. By controlling the yaw angle adjustment system 121 in an appropriate manner it can be made sure, that during a normal operation of the wind turbine 100 the nacelle 122 is always properly aligned with the actual direction of the wind driving the wind turbine 100. However, for instance in order to reduce a mechanical load acting on structural components of the wind turbine the yaw angle adjustment system 121 can also be used to adjust the yaw angle to a position, wherein the nacelle 122 is intentionally not perfectly aligned with the current wind direction.

The wind turbine 100 according to the embodiment described here further comprises a rotor 110 having three blades 114. In the perspective of FIG. 1 only two blades 114 are visible. The rotor 110 is rotatable around a rotational axis 110a. The blades 114, which are mounted at a driving collar 112, which is also called a hub, extend radial with respect to the rotational axis 110a.

In between the driving collar 112 and a blade 114 there is respectively provided a blade adjustment system 116 in order to adjust the blade pitch angle of each blade 114 by rotating the respective blade 114 around a non depicted axis being aligned substantially parallel with the longitudinal extension of the respective blade 114. By controlling the blade adjustment system 116 the blade pitch angle of the respective blade 114 can be adjusted in such a manner that at least when the wind is not so strong a maximum wind power can be retrieved from the available wind power. However, in order to reduce a mechanical load acting on the respective blade 114, the blade pitch angle can also be intentionally adjusted to a position, in which only a reduced wind power is captured.

As can be seen from FIG. 1, within the nacelle 122 there is provided an optional gear box 124. The gear box 124 is used to convert the number of revolutions of the rotor 110 into a higher number of revolutions of a shaft 125, which is coupled in a known manner to a generator 128. Further, a brake 126 is provided in order to stop the operation of the wind turbine 100 or to reduce the rotational speed of the rotor 110 for instance (a) in case of an emergency, (b) in case of too strong wind conditions, which might harm the wind turbine 100, and/or (c) in case of an intentional saving of the consumed fatigue life time and/or the fatigue life time consumption rate of at least one structural component of the wind turbine 100.

It is mentioned that the brake 126 is normally only used in case of stop types were the stopping time is important or to prevent the rotor from slowly rotating at the end of the stop. Generally, the rotor 110 of the wind turbine 100 is stopped by pitching the blades 114.

The wind turbine 100 further comprises a control system 150 for operating the wind turbine 100 in a highly efficient manner. Apart from controlling for instance the yaw angle adjustment system 121 the depicted control system 150 is also used for controlling the rotational speed of the rotor 110 by adjusting the blade pitch angle of the rotor blades 114 and by determining an appropriate power generation reference value for the wind turbine 100 in an optimized manner. Further, the control system 150 is used for adjusting the yaw angle of the nacelle 122 respectively of the rotor 110.

For controlling the operation of the wind turbine 100 the control system 150 is connected to a rotational speed sensor 143, which according to the embodiment described here is connected to the gear box 124. The rotational speed sensor 143 feeds a signal to the control system 150, which is indicative for the current rotational speed of the rotor 110.

Although being not essential for the carrying out the described method and for realizing the described control device for compensating at least partially a mechanical torque acting on the top of the tower 120, the wind turbine 100 comprises (a) a power sensor 141 being connected to the generator 128 and (b) angle sensors 142, which, according to the embodiment described here, are connected to the respective blade adjustment system 116. The power sensor 141 provides information about the current power production of the wind turbine 100. The angle sensors 142 provide information about the current blade pitch angle settings of all rotor blades 114.

As can be seen from FIG. 1, the control system 150 comprises a control device 160, which, as will be described below in more detail, is configured for controlling the operation of the wind turbine 100 in such a manner that oscillatory movements of the top of the tower 120 of the wind turbine 100 will be damped.

Figure 2:
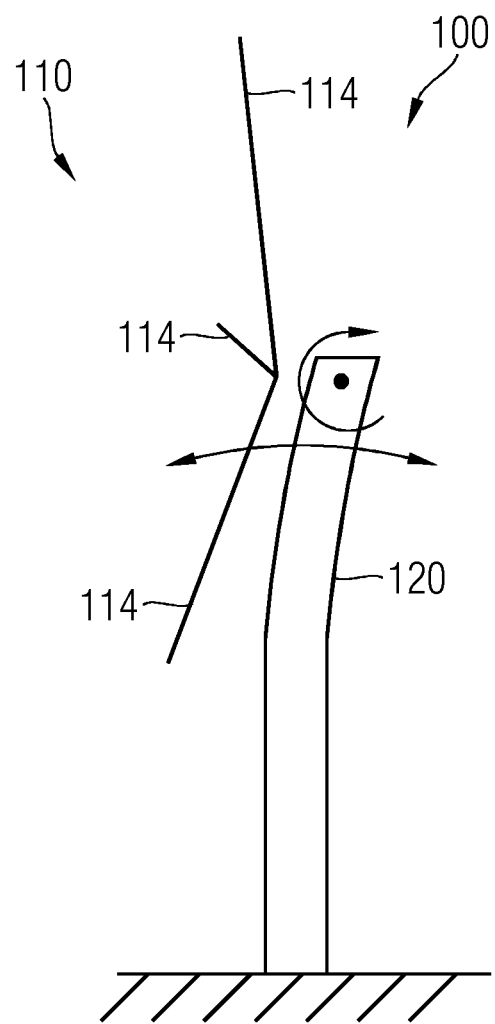
FIG. 2 shows a side view of a wind turbine, wherein the top of the tower of the wind turbine performs a fore-aft oscillation movement, which is associated with a mechanical torque acting on the top of the tower.

FIG. 2 shows a side view of a wind turbine 100, the tower 120 of which performs a fore-aft oscillatory movement. The oscillatory movement of the top of the tower 120, which is indicated by a curved double arrow, is associated with a mechanical torque acting on the top of the tower 120. Mathematically this torque is represented by a vector being oriented perpendicular to the plane of projection.

FIG. 2, in which this mechanical torque is indicated by a bent arrow, depicts the tower 120 at a phasing, where the top of the tower 120 moves to the right side. The mechanical torque acting on the top of the tower is often referred to as a tower top tilt torque.

The general principle of the damping method described in this document is that a sinusoidal component in the tower top tilt torque can be generated by using the gyroscopic forces when yawing the rotor 110.

In accordance with formula (III) given above the tower top tilt torque which is generated during yawing can be calculated from the rotational inertia of the rotor 110 scaled by the cross product of the rotor speed and the yaw speed.

Figure 3:
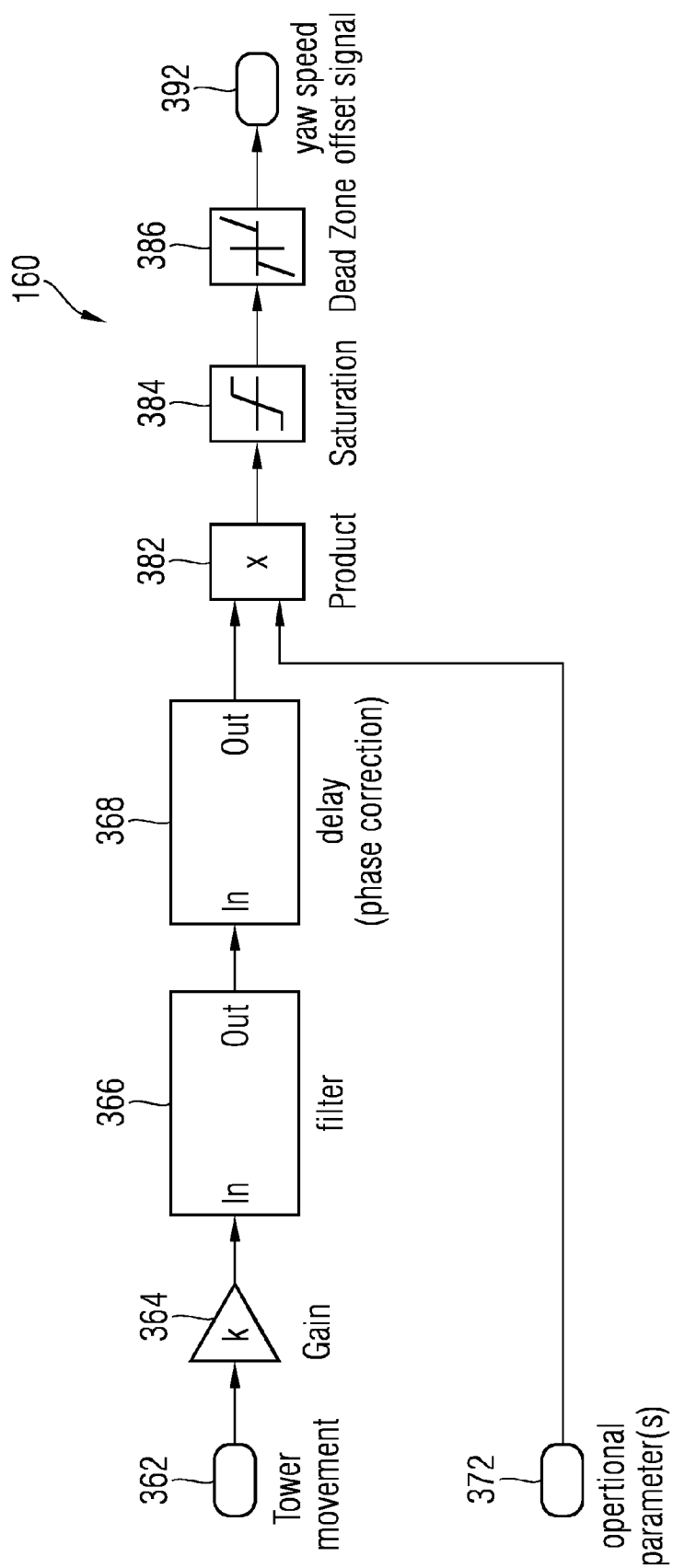
FIG. 3 shows a control device for compensating at least partially a mechanical torque acting on the top of a tower of a wind turbine.

FIG. 3 shows in a block diagram a control device 160 for damping an oscillatory movement of the tower top of a wind turbine. According to the embodiment described here the control device 160 implements a fore-aft damping algorithm for the tower top. In the following the principle of the fore-aft damping algorithm is elucidated.

First the tower movement and/or the nacelle movement is measured. In practice, it may be is easiest to measure the acceleration of the nacelle, but speed, position, or tilt angle of the nacelle may also be used. A corresponding tower movement signal, which is input to the control device 160 via an input terminal 362, is amplified with a gain k in an amplifier 364 in order to allow for an adjustment of the output amplitude of the control device 160. The amplified signal is then filtered by means of a filter 366. With the filter 366 the frequencies that are damped are limited such that they only include the fundamental tower oscillation frequency. The phase of the filtered signal is then corrected by using a variable delay 368 and/or some other filter configurations.

According to the embodiment described here the value of an operational parameter such as the wind turbine power production, the wind speed, the rotor speed, the pitch angle of the rotor blades, turbulence etc. is used to adjust the overall gain of the damping function of the control device 160. This gain adjustment is realized by a multiplier 382. As can be seen from FIG. 3, a signal representing the value of such an operational parameter is input to the control device 160 via a further input terminal 372 and forwarded to the multiplier 382.

Finally, the signal output from the multiplier 382 is saturated to some maximum values by a signal limiter 384. Further, a so called dead zone generating unit 386 is used to apply a dead zone for the output signal of the signal limiter 384.

The output signal of the algorithm performed with the control device 160 is a yaw speed offset signal which is output at an output terminal 392. This yaw speed offset signal can be added to an existing yaw speed reference of a control system of the wind turbine. Alternatively, the output may be a reference yaw position signal or a reference yaw acceleration signal, with in an appropriate manner changes the algorithm parameters.

Since the yaw activity may also be constrained by the wear and the tear of the yaw system, which may prevent continually running the algorithm, the offset signal may be used to schedule when to start and when to stop a yawing movement being used for generating the gyroscopic torque.

In this respect it is pointed out that a wind turbine respectively the nacelle or the rotor of a wind turbine often has to yaw to face the wind. This is a part of the normal operation of the wind turbine.

Figure 4:
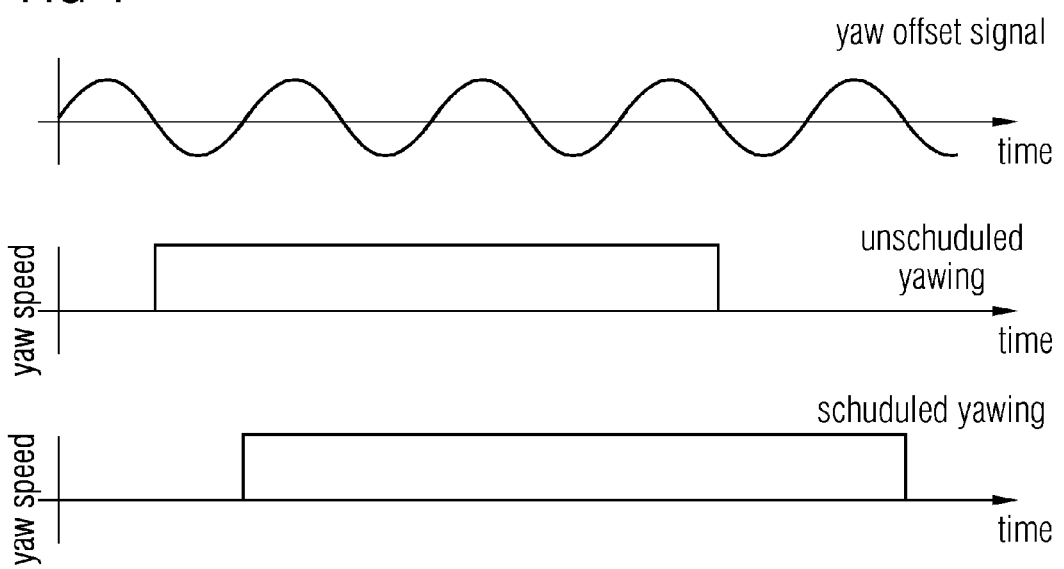
FIG. 4 illustrates a comparison between and unscheduled yawing movement and a scheduled yawing movement which is coordinated with oscillations of the top of a tower of a wind turbine.
Figure 5:
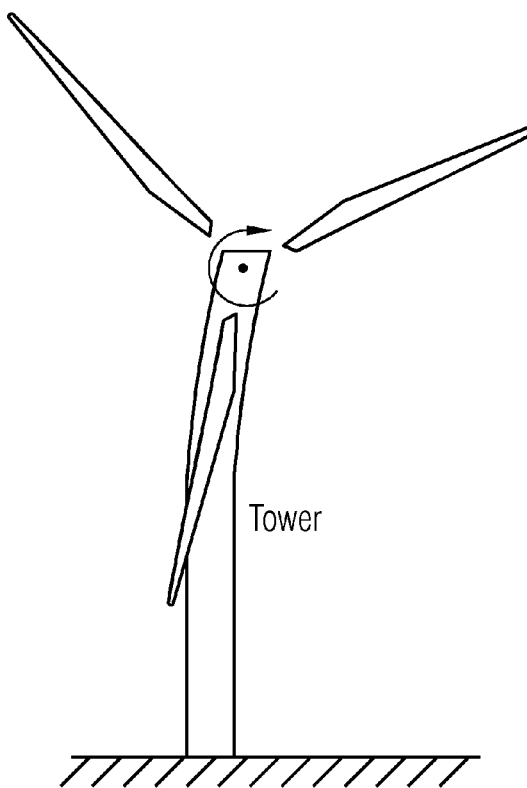
FIG. 5 illustrates how a clock-wise torque moves the wind turbine tower top sidewise to the right.

The principle of a scheduled yawing movement which is coordinated with oscillations of the tower top of a wind turbine is illustrated in FIG. 4.

The upper subplot shows an ideal yaw offset signal as a function of time to provide a maximum damping.

The middle subplot shows an unscheduled yawing signal in order to face the rotor of the wind turbine into the wind. The unscheduled yawing signal has the right sign and the wrong sign respectively for approximately the same amount of time. This yields a net damping effect of zero.

The lowest subplot shows a scheduled yaw period, where the sign of the yawing signal is correct, and thus provides damping in most of the time yielding a positive damping effect. This makes clear that a correct timing of the yaw activity with respect to the oscillatory fore-aft tower top movement is important for realizing an effective damping.

Scheduling the yaw activity in accordance with FIG. 4 adds a damping to tower top oscillations without increasing the overall yaw activity or the number of yaw reversals. In other words, with the described yaw strategy it may not be necessary to increase the number of yaw starts and yaw stops or the number of yaw direction changes.

In other words, a scheduled or coordinated yaw movement can be used to damp fore-aft tower oscillations. This can be done effectively by using a sinusoidal yaw offset signal and/or updating the existing control law which will not cause additional yaw activity.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A method for damping an oscillatory movement of a top of a tower of a wind turbine, the wind turbine comprising wind-driven blades rotating a rotor about a rotation axis attached to a nacelle on the tower, the method implemented by electronics of the wind turbine comprising a processor executing the steps of:
measuring a movement of the top of the tower;
actuating a yaw adjustment system of the wind turbine to yaw the nacelle around an axis substantially aligned with the longitudinal axis of the tower with a yawing speed and direction that causes the rotating rotor to create a gyroscopic torque on the top of the tower that opposes the movement of the top of the tower.

2. The method as set forth in claim 1, wherein
the yawing of the nacelle of the wind turbine is further carried out for aligning the rotational axis of the rotor at least approximately with an actual direction of a wind driving the wind turbine, wherein a direction of the yawing for wind alignment is timely coordinated with a periodic fore-aft movement of the top of the tower to create the gyroscopic torque on the top of the tower that opposes the movement of the top of the tower.

3. The method as set forth in claim 1, wherein the electronics comprising the processor further perform the steps of:
determining a fundamental frequency and a phase of the oscillatory movement of the top of the tower based on the measured tower movement;
changing the yawing speed and direction of the nacelle periodically such that the resulting gyroscopic torque has a periodic time dependency, and a sign of the gyroscopic torque changes periodically in opposition to a sign of a torque of the oscillatory movement of tower.

4. The method as set forth in claim 3, wherein
the periodic time dependency of the oscillatory movement of the top of the tower is at least approximately sinusoidal;
the periodic time dependency of the yawing movement and the resulting gyroscopic torque is at least approximately sinusoidal.

5. The method as set forth movement and
(b) the periodic time dependency of the oscillatory in claim 3, wherein
(a) the periodic time dependency of the yawing movement are in phase opposition with respect to each other.

6. A control device for damping an oscillatory movement of a top of a tower of a wind turbine, the control device comprising
a processing unit configured for coordinating
(i) a yawing movement being associated with yawing a rotating rotor of the wind turbine with a yawing speed around an axis being aligned with the longitudinal axis of the tower with
(ii) the oscillatory movement of the top of the tower in such a manner that a gyroscopic torque resulting (a) from the rotating rotor with a rotational speed and (b) from the yawing of the rotor damps the oscillatory movement of the top of the tower.

7. A wind turbine for generating electrical power, the wind turbine comprising:
the rotor having at least one blade, wherein
the rotor is rotatable around a rotational axis and
the at least one blade extends radially with respect to the rotational axis,
a generator being mechanically coupled with the rotor, and
a control device as set forth in claim 6.

8. A computer-implemented method for operating a wind turbine, the wind turbine comprising a rotating rotor mounted to a nacelle on a top of a wind turbine tower, the rotor having an axis of rotation substantially perpendicular to a longitudinal axis of the tower, the nacelle having a yaw axis substantially aligned with the tower axis, the method comprising executing on a processor the steps of:
receiving a signal from a sensor of the wind turbine that indicates a motion of the top of the tower; and
calculating and outputting a yaw control signal to a yaw angle adjustment system of the wind turbine that rotates the nacelle about the yaw axis in a direction and at a time and rate that produces a gyroscopic torque of the rotating rotor on the tower that opposes said motion of the top of the tower.

9. The computer-implemented method of claim 8, further comprising executing on the processor the steps of:
- determining a fundamental frequency and phase of a periodic oscillation of the top of the tower in a direction of movement thereof based on said indication of motion;
- controlling the yaw control signal to periodically reverse the rotation of the nacelle about the yaw axis in a time sequence of periodic yaw reversals that produces the gyroscopic torque of the rotor on the tower as an oscillating torque that is in phase opposition to said periodic oscillation of the top of the tower.

10. The computer-implemented method of claim 8, further comprising executing on the processor the steps of:
- determining a wind alignment yaw adjustment having a direction and angle that substantially aligns the rotor axis with a wind direction; and
- applying the wind alignment yaw adjustment at a time in the time sequence of the periodic yaw reversals wherein the yaw alignment adjustment direction and the yaw periodic reversals are in the same direction.

* * * * *